United States Patent
Lenke

(10) Patent No.: US 8,300,980 B2
(45) Date of Patent: Oct. 30, 2012

(54) SYSTEM, METHOD AND COMPUTER PROGRAM PRODUCT FOR PROVIDING A HIGH RESOLUTION TEXTURE WITHIN AN IMAGE

(75) Inventor: Sebastian Lenke, Dortmund (DE)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 12/366,835

(22) Filed: Feb. 6, 2009

(65) Prior Publication Data
US 2009/0238492 A1 Sep. 24, 2009

Related U.S. Application Data

(60) Provisional application No. 61/037,590, filed on Mar. 18, 2008.

(51) Int. Cl.
*G06K 9/36* (2006.01)

(52) U.S. Cl. ........ 382/276; 382/284; 382/299; 382/300; 358/525; 358/540; 358/450

(58) Field of Classification Search .................. 382/284, 382/294, 299, 300; 358/525, 537, 540, 450
See application file for complete search history.

(56) References Cited

U.S. PATENT DOCUMENTS

| | | | |
|---|---|---|---|
| 5,444,487 A | | 8/1995 | Kondo et al. |
| 6,323,905 B1 | | 11/2001 | Kondo et al. |
| 7,034,397 B2 * | | 4/2006 | Raaijmakers et al. ........ 257/750 |
| 7,069,182 B2 * | | 6/2006 | Johnson et al. ................ 702/182 |
| 7,391,931 B2 * | | 6/2008 | Kameyama et al. .......... 382/294 |
| 7,623,163 B2 * | | 11/2009 | Neter ............................. 348/247 |
| 7,738,739 B2 * | | 6/2010 | Altunbasak et al. .......... 382/300 |
| 8,179,445 B2 * | | 5/2012 | Hao .......................... 348/208.13 |
| 8,218,068 B2 * | | 7/2012 | Deever et al. ................. 348/362 |
| 8,224,043 B2 * | | 7/2012 | Yamada ........................ 382/124 |
| 8,224,082 B2 * | | 7/2012 | Kumar et al. ................. 382/167 |

OTHER PUBLICATIONS

Harrison, Paul, "Patchwork texture synthesis," Monash University School of Computer Science and Software Engineering, http://www.logarithmic.net/pfh-files/publications/Harrison-2001-resynthesizer.pdf, pp. 1-19, Jul. 2002.

Kwatra, Vivek et al., "Graphcut Textures: Image and Video Synthesis Using Graph Cuts," GVU Center/College of Computing, Georgia Institute of Technology, http://www.cc.gatech/edu/cpl/projects/graphcuttextures, pp. 1-10, 2003.

Carsten Dolar, et al., "Entwicklungstrends der digitalen Videosignalverarbeitung", 11. Dortmunder Fernsehseminar, 2005.

(Continued)

*Primary Examiner* — Yosef Kassa
(74) *Attorney, Agent, or Firm* — Oblon, Spivak, McClelland, Maier & Neustadt, L.L.P.

(57) ABSTRACT

A system and method for providing a high resolution texture within an image, comprising means to receive texture information contained within a low resolution image and to generate at least a first and a second signal based on the received texture information, wherein the first signal comprises high frequency parts of the received texture information, means to resynthesize the first signal by inserting a plurality of parts of the low resolution image into the high resolution image in an appropriate combination, means to interpolate the second generated signal and means to combine the resynthesized first signal with the interpolated second signal.

22 Claims, 6 Drawing Sheets

OTHER PUBLICATIONS

Figure 1:
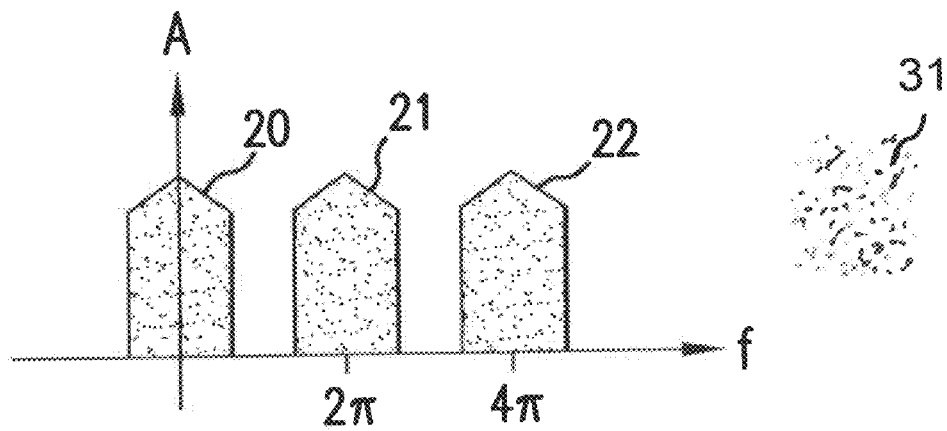

Zin Li, et al., "New Edge-Directed Interpolation", IEEE Transactions on Image Processing, vol. 10, No. 10, Oct. 2001, pp. 1521 to 1527.

Randall C. Reininger, et al., "Distribution of the Two-Dimensional DCT Coefficients for Images", IEEE Transactions on Communications, vol. COM-31, No. 6, Jun. 1983, pp. 835 to 839.

William T. Freeman, et al., "Example-Based Super-Resolution", Image-Based Modeling, Rendering and Lighting, IEEE Computer Graphics and Applications, Mar./Apr. 2002, pp. 56 to 65.

Aaron Hertzmann, et al., "Image Analogies". ACM SISGGRAPH, Computer Graphics Proceedings, Annual Conference Series, 2001, 14 Pages.

H. Schröder, et al. Mehrdimensionale Sig-nalverarbeitung- Band 2, Teubner 2000, submitting Statement of Relevancy.

J. Proakis, et al. Digital Communications, 2nd Ed., McGraw-Hill, 1989, submitting Statement of Relevancy.

X. Wu, Synthetische Kantenversteilerung zur Verbesserung der Bildschärfe, Dissertation 1993, submitting Statement of Relevancy.

* cited by examiner

SYSTEM, METHOD AND COMPUTER PROGRAM PRODUCT FOR PROVIDING A HIGH RESOLUTION TEXTURE WITHIN AN IMAGE

This application claims priority to U.S. Application No. 61/037,590, filed Mar. 18, 2008, the entire contents of which are incorporated herein by reference.

The present invention relates to a system, method and computer program product for providing a high resolution texture within an image. Specifically, the present invention relates to the field of adapting a texture contained within a low resolution for a high resolution display.

Generally, image sequences often have to be changed from a low resolution, e.g. from a standard television SDTV, to a high resolution, e.g. a high definition television HDTV. For interpolating the image sequences there exist mainly methods which are adapted to interpolate edges and homogeneous parts. The quality of these methods in parts of the image containing textures are quite limited, since the existing methods for interpolating base on the determination of an edge direction or determination of a defined image structure. Since in textures no specified edge direction or structure can be determined, methods for interpolating textures are needed.

When enlarging an image a larger frequency range can be used but simple methods are not adapted to use this larger frequency range. Only edge adaptive or image structure adaptive methods for interpolation or super resolution methods allow to enhance the quality of the image. Here fore specific elements within the image have to be detected. In case of irregular textures this is not possible since due to the randomness the image parts are different. When using a spatial interpolation it is only possible to preserve the frequency spectrum provided by the low resolution image. Due to this limitation enlarged textures when displayed with high resolution appear more coarse grained than they are supposed to be or than they are in the low resolution image.

In case of irregular textures with the present methods it is not possible to create the suitable high frequency parts. Due to the number of variation possibilities database based methods cannot be used. Also methods based on an edge detection or detection of image structures cannot provide useful information when they are applied to irregular structures. Only when using very complex super resolution methods with a very high processing capacity a slight improvement in the quality can be achieved. In any case there is the problem of the need of either large databases or high processing capacities.

It is thus the object of the present invention to provide an improved system, method and computer program product for providing a high resolution texture within an image.

The present invention relates to a system for providing a high resolution texture within an image, comprising means to receive texture information contained within a low resolution image and to generate at least a first and a second signal based on the received texture information, wherein the first signal comprises high frequency parts of the received texture information, means to resynthesize the first signal by inserting a plurality of parts of the low resolution image into the high resolution image in an appropriate combination, means to interpolate the second generated signal and means to combine the resynthesized first signal with the interpolated second signal.

Preferably, the means to resynthesize define a group of neighboring pixels within the high resolution image and compare said group with a group of neighboring pixels in the low resolution image, Hereby, the means to resynthesize select a pixel value of the low resolution image to be inserted into the high resolution image dependent on the comparison of the neighboring pixels within the two images.

Alternatively, the means to resynthesize select a patch consisting of several pixels of the low resolution image to be inserted into the high resolution image dependent on the comparison of the neighboring pixels within the two images.

Preferably, the means to generate at least a first and a second signal comprise a low pass filter for generating a second signal comprising the low frequency parts. Hereby, the means to generate at least a first and a second signal comprise means to subtract the second signal comprising the low frequency parts from the received texture information to generate said first signal comprising the high frequency parts of said received texture information.

Alternatively, the means to generate at last a first and a second signal comprise means to split the texture information into a first signal comprising high and middle frequency parts of the texture information and into a second signal comprising low and middle frequency parts of the texture information.

Alternatively, the means to generate at last a first and a second signal comprise a high pass filter for generating a first signal comprising the high frequency parts of the texture information. Hereby, the means to generate at last a first and a second signal comprise means to generate a second signal being identical to the received texture information.

The present invention further relates to a method for providing a high resolution texture within an image, comprising the steps of receiving texture information contained within a low resolution image, generating at least a first and a second signal based on the received texture information, wherein the first signal comprises high frequency parts of the received texture information, resynthesizing the first signal by inserting a plurality of parts of the low resolution image into the high resolution image in an appropriate combination, interpolating the second generated signal and combining the resynthesized first signal with the interpolated second signal.

Additionally, the present invention relates to a computer program product stored on a computer readable medium which causes a computer to perform the steps of receiving texture information contained within a low resolution image, generating at least a first and a second signal based on the received texture information, wherein the first signal comprises high frequency parts of the received texture information, resynthesizing the first signal by inserting a plurality of parts of the low resolution image into the high resolution image in an appropriate combination, interpolating the second generated signal and combining the resynthesized first signal with the interpolated second signal.

According to a further aspect, the present invention relates to a system for processing an image sequence containing texture information, comprising means to receive a first low resolution image and subsequent second low resolution image, means to analyze the two images to detect an identical texture part within the two subsequent images and to determine the motion characteristics of the texture part, means to provide the first image with a high resolution containing said texture part with high resolution and means to generate the second image with a high resolution thereby inserting the high resolution texture part of the first image into the high resolution second image dependent on said motion characteristics.

According to this further aspect the present invention relates to a method for processing an image sequence containing texture information comprising the steps of receiving a first low resolution image and subsequent second low resolution image, analyzing the two images to detect an identical texture part within the two subsequent images and to determine the motion characteristics of the texture part, providing the first image with a high resolution containing said texture part with high resolution and generating the second image with a high resolution thereby inserting the high resolution texture part of the first image into the high resolution second image dependent on said motion characteristics.

According to this further aspect the present invention additionally relates to a computer program product stored on a computer readable medium which causes a computer to perform the steps of receiving a first low resolution image and subsequent second low resolution image, analyzing the two images to detect an identical texture part within the two subsequent images and to determine the motion characteristics of the texture part, providing the first image with a high resolution containing said texture part with high resolution and generating the second image with a high resolution thereby inserting the high resolution texture part of the first image into the high resolution second image dependent on said motion characteristics.

Figure 2:
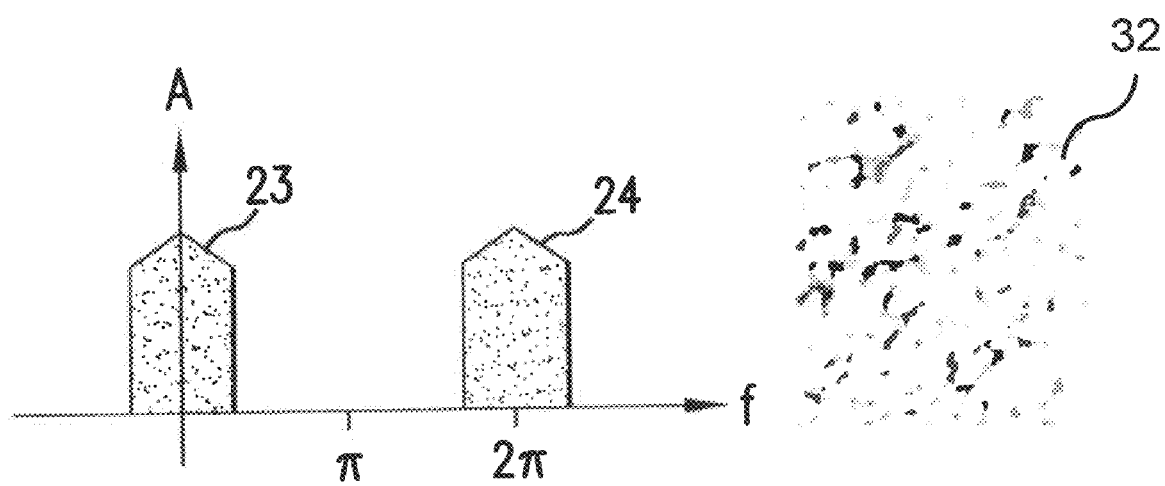
Figure 3:
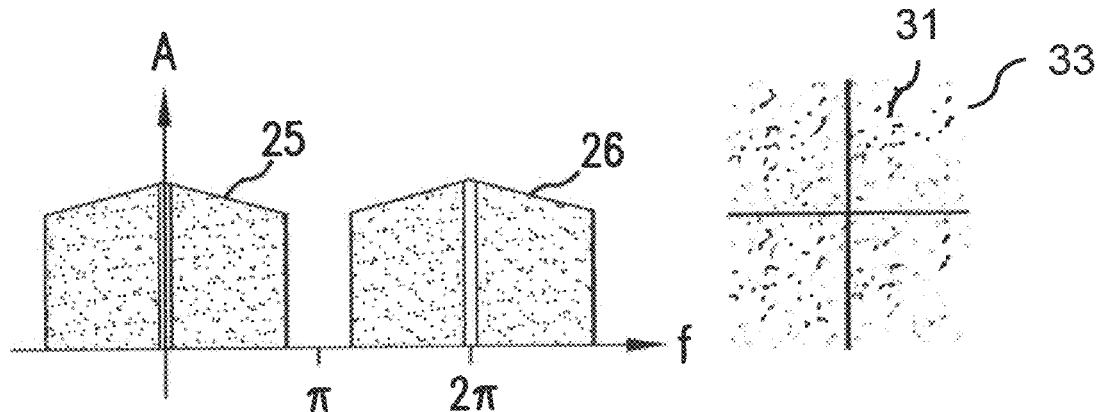
Figure 4:
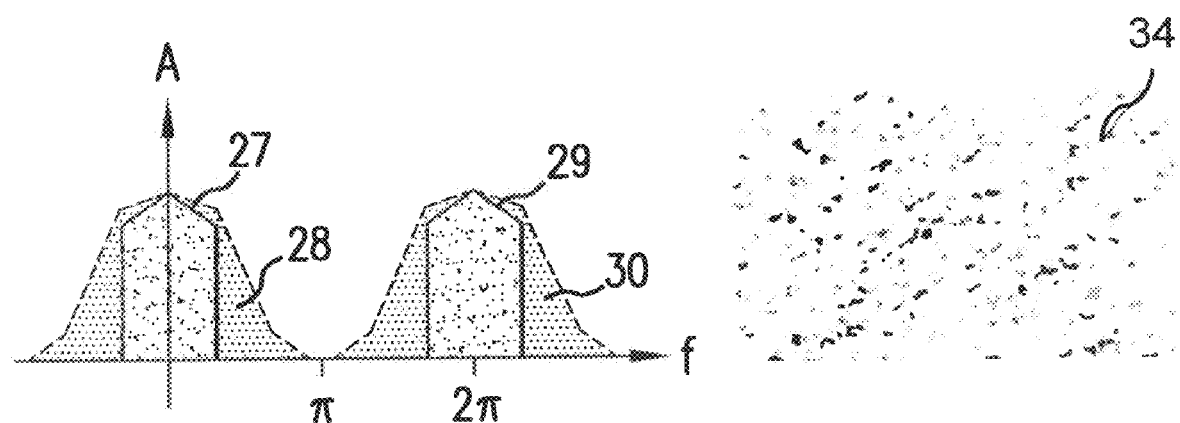
Figure 5:
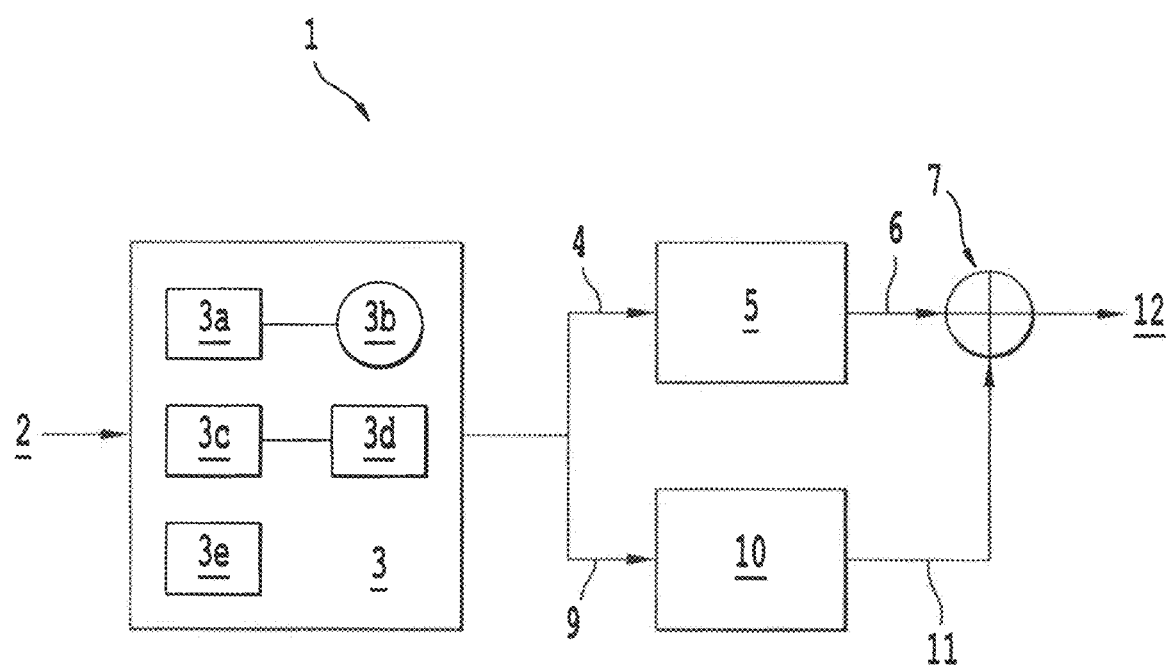
Figure 9:
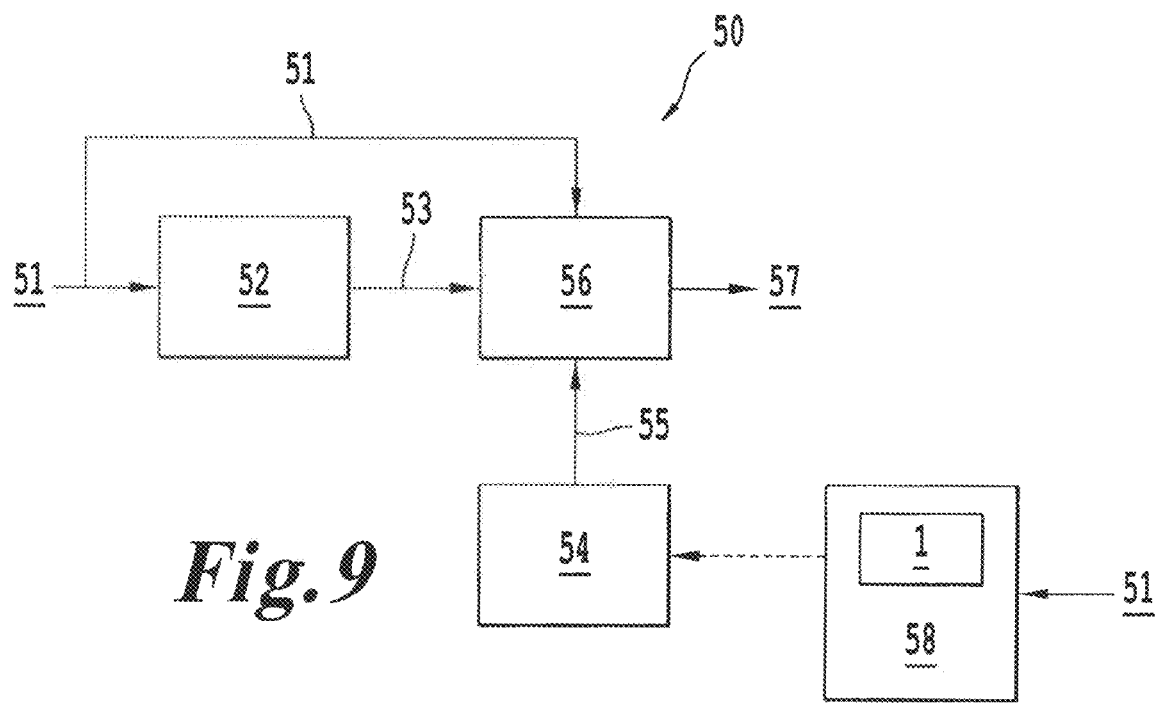
Figure 6:
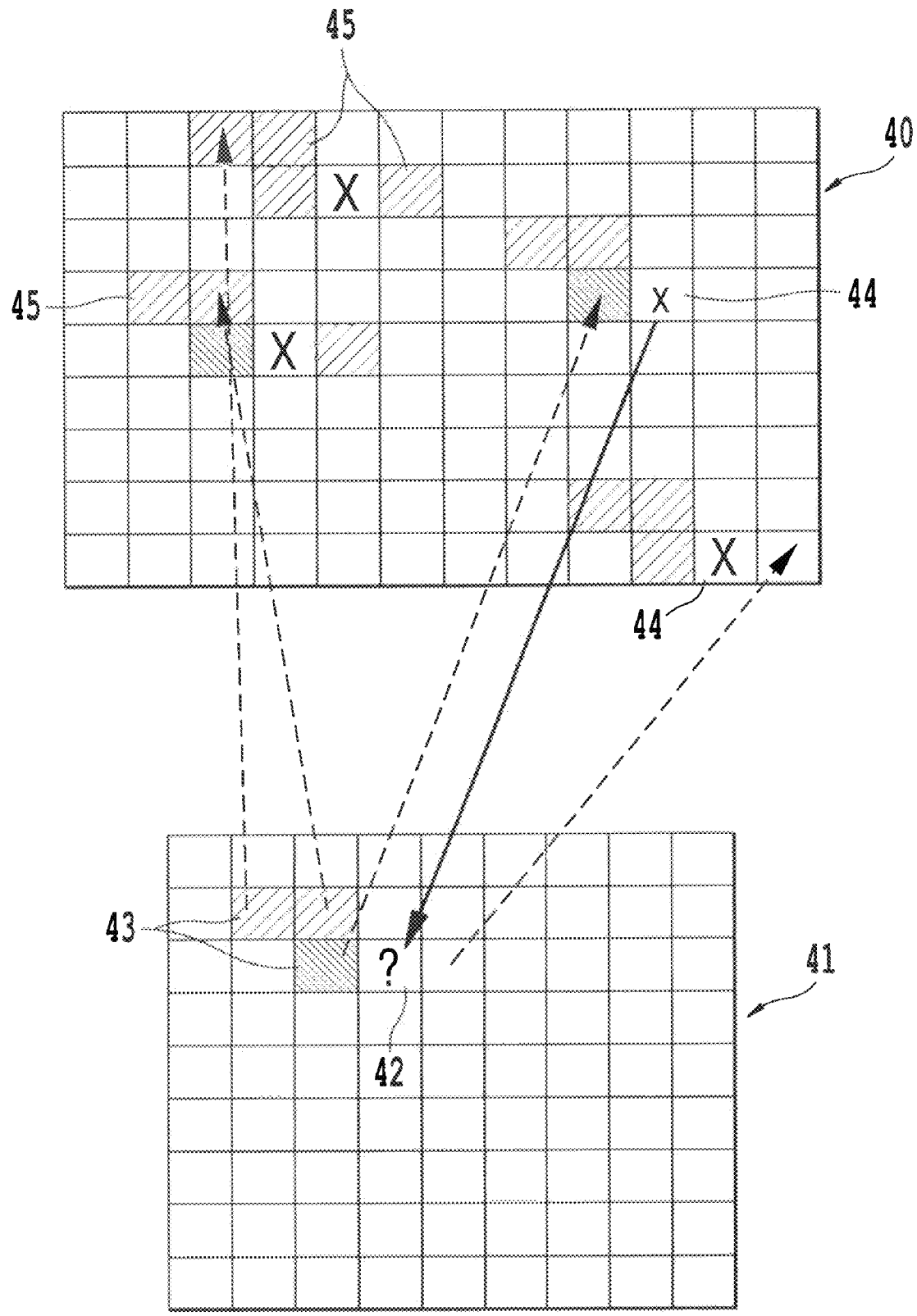
Figure 7:
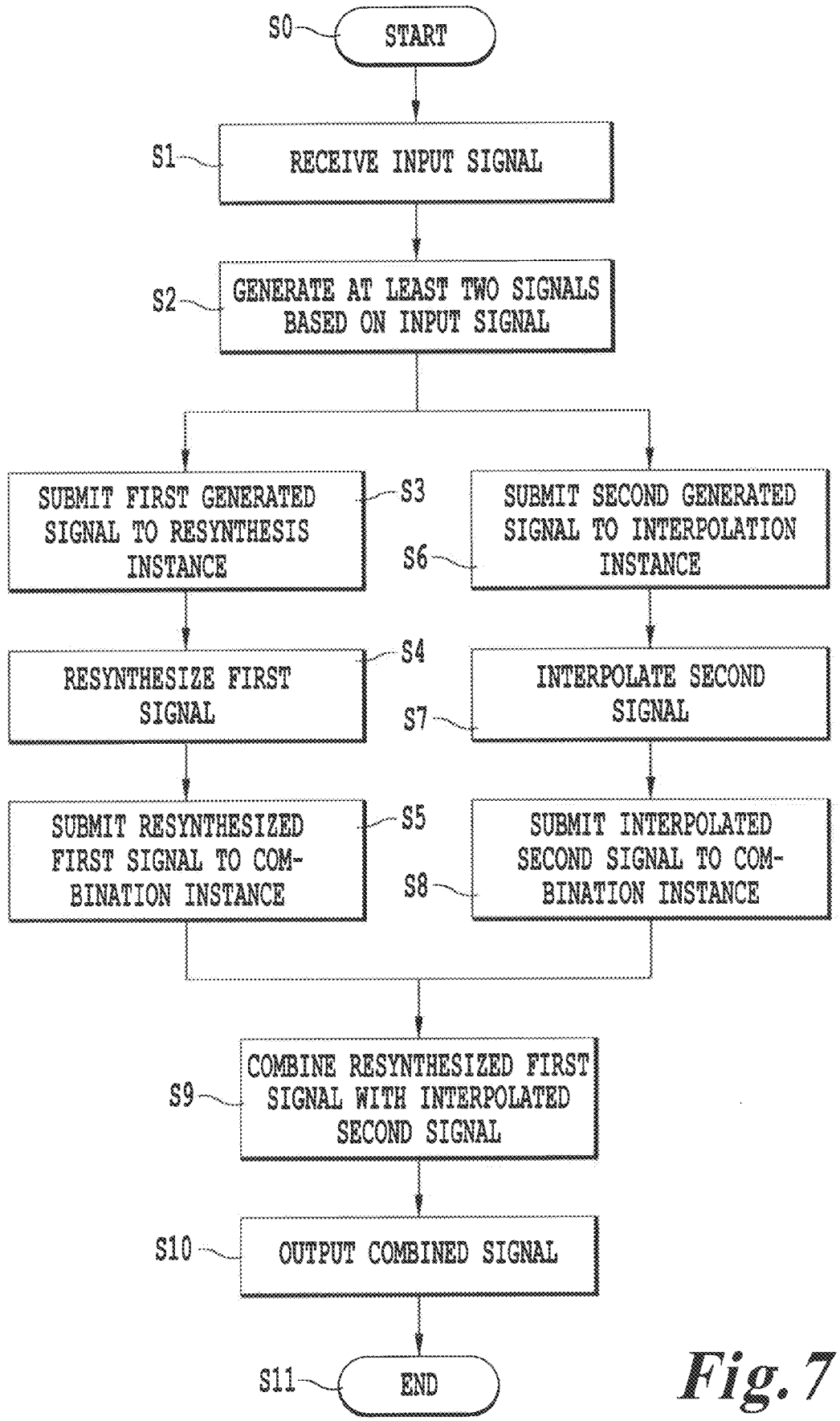

The present invention will be now be explained in more detail in the following description of preferred embodiments in relation to the enclosed drawings in which FIG. 1 shows an image and corresponding frequency spectrum of a low resolution image, FIG. 2 shows an image and corresponding frequency spectrum of an interpolated high resolution image, FIG. 3 shows an image and corresponding frequency spectrum of a tiled high resolution image, FIG. 4 shows an image and corresponding frequency spectrum of a high resolution image according to the present invention, FIG. 5 shows a block diagram of a system for providing a high resolution texture within an image according to the present invention, FIG. 6 shows a schematic illustration of the steps of resynthesizing an image, FIG. 7 is a flow chart showing the process steps according to the method for providing a high resolution texture within an image according to the present invention, FIG. 8 shows examples of images created by using different methods, and FIG. 9 shows a schematic block diagram of a system for providing a high resolution image sequence.

In FIG. 1 a low resolution image 31 is shown with its corresponding frequency spectrum. Hereby, on the x-axis the frequency f and on the y-axis the amplitude A, i.e. the occurrence of the respective frequency, is shown. The x-axis hereby is shown with respect to a normalized sampling frequency, i.e. the sampling frequency corresponds to $\pi$. The real frequency spectrum 20 is shown and spectral repetitions 21, 22 of the real frequency spectrum 20 are also shown which arise due to the discrete sampling values.

In the following FIGS. 2 to 4 different images being an enlarged, i.e. a high resolution image, of the original low resolution image 31, are shown with its corresponding frequency spectrum. In FIG. 2 an enlarged image 32 is shown obtained by interpolation. Hereby the frequency spectrum is enlarged and the spectral repetition is attenuated at $\pi$. As can be seen from FIG. 2 the problem with the interpolation is that the image appears less sharp.

A further possibility as shown in FIG. 3 is to use the original image 31 several times within the enlarged image 33. This corresponds to a widened frequency spectrum 25, 26 as shown in the corresponding diagram. The problem with this method is that the original structure of the image is not maintained.

FIG. 4 shows an enlarged image 34 according to the present invention. The corresponding frequency spectrum shows the original frequency spectrum 27 and the spectral repetition 29 and additionally according to the present invention the high frequency parts 28, 30, which are created according to the present invention and are added to the frequency spectrum so that an enlarged image is obtained which is sharp and still reflects the original structure.

In the following the system and method according to the present invention will be explained in detail.

FIG. 5 shows a system for providing a high resolution texture within an image. When a low resolution image is received, then first the image is analyzed in order to detect different parts within the image, i.e. to detect edges, details, homogeneous parts and textures. Only the information relating to the texture within the low resolution image is fed as texture information 2 to the system for providing a high resolution texture within an image as shown in FIG. 5.

The texture information of the low resolution image is fed to means 3 which are adapted to generate at least a first signal 4 and a second signal 9 based on the received texture information. The means to generate the at least two signals can be implemented in different ways as will be explained in the following. The first signal 4 hereby in any case comprises only high frequency parts or high and middle frequency parts of the texture information.

In a first embodiment, the generation means 3 comprises a low pass filter 3a and a subtracting means 3b. The low pass filter 3a filters out the low frequency parts within the texture input 2 and submits the signal comprising the low frequency parts to the subtracting means 3b. The original texture information 2 is also submitted to the subtracting means 3b. The subtracting means 3b subtracts the signal comprising the low frequency parts from the texture information 2 and thereby generates a signal comprising only high frequency parts of the texture information. The signal comprising the high frequency parts of the texture information is then submitted as first signal 4 to a resynthesizing means 5 and the signal comprising the low frequency parts of the texture information is submitted as second signal 6 to the interpolation means 10. The advantage of this first embodiment is the simple implementation and the low effort for generating the two signals.

In a second embodiment the generation means 3 comprises two filters, whereby a first filter 3c filters the high and middle frequency parts of the texture information 2 and submits a signal containing the high and middle frequency parts as first signal 4 to the resynthesizing means 5 and whereby a second filter 3d filters the middle and low frequency parts of the texture information 2 and submits a signal containing the middle and low frequency parts as second signal 6 to the interpolation means 10. The two filters 3c, 3d hereby split the texture information 2 into two bands, which are preferably overlapping in the middle frequency range. This signal creation is ideal and produces the best results in the high resolution image. But it is also possible to create two bands, which are not overlapping at all.

In a third embodiment the generation means 3 comprises a high pass filter 3e for filtering out the high frequency parts of the texture information 2. The signal comprising the high frequency parts is then submitted as first signal 4 to the resynthesizing means 5 and the original texture information 2 is completely submitted to the interpolation means 10 as second signal 6.

In a fourth embodiment all above mentioned components, i.e. the low pass filter 3a, the subtracting means 3b, the first filter 3c, the second filter 3d and the high pass filter 3e are implemented in the generating means 3 and can be chosen dependent on the actual needs.

The resynthesizing means 5 receives the first signal 4 comprising the high frequency parts and creates a detail signal comprising high frequency parts which then can be added to the interpolated second signal in order to create the high resolution image containing also high frequency parts as shown in FIG. 4. The method for resynthesizing bases on the idea to use parts of the original low resolution image for creating the high resolution image and to provide the high resolution image by an appropriate combination of the parts of the low resolution image. The term "part" hereby may comprise one single pixel, i.e. the part consists of a single pixel, or may comprise a plurality of pixels. The detailed process of resynthesizing the first signal 4 will be explained later. The resynthesizing means 5 then outputs a resynthesized first signal 6 to a combination means 7.

The interpolation means 10 interpolates the received second signal 9 according to the known methods and outputs an interpolated second signal 11 also to the combination means 7. The combination means 7 then adds the generated detail signal, i.e. the resynthesized first signal 6 to the interpolated second signal 11 and outputs a combined signal 12 which is a high resolution texture which then can be used in the high resolution image as shown in FIG. 4.

Afterwards (not shown in the Figures for the sake of clarity) the high resolution texture is combined with the other high resolution parts, e.g. edges, details, homogeneous parts of the like to obtain a complete high resolution image.

The present invention has several advantages. Since a part of the received texture information 2 or the whole received texture information 2 is interpolated, the original structure is maintained. On the other hand, since also high frequency parts are generated and added to the readily maintained structure a high resolution image which is very sharp but still provides the original structure can be obtained. The detail signal, i.e. the resynthesized first signal 6 comprising the high frequency parts does not exactly corresponds to the original detail signals which have been lost due to the low resolution image, but are of a similar shape so that the appearance of the high resolution image created according to the present invention is very similar to the original image. Further, dependent on the used resynthesizing method the processing capacities needed for the present method can be quite small and no large database storages have to be provided.

With reference to FIG. 6 now a first example of a method of resynthesizing will be explained. This method bases on the method developed by Harrison described in Paul Harrison: "Patchwork texture synthesis", technical report 2002/119, Monash University School of Computer Science and Software Engineering, 2002, which is included herein by reference.

The resynthesis hereby bases on the idea to define a group of neighboring pixels within the high resolution image, to compare said group with a group of neighboring pixels in the low resolution image and to select a pixel value of the low resolution image to be inserted into the high resolution image dependent on the comparison of neighboring pixels within the two images.

In FIG. 6 a texture part within a low resolution image is designated with 40 and a texture part within a high resolution image, which is supposed to be created by the resynthesizing means 5, is designated with 41. The blocks within the image each designate a pixel. In order to explain the method in a simplified way, it is presumed, that several pixels of the high resolution image 41 have already been set. The next pixel 42 which has to be set is marked with "?" within the high resolution image 41. For finding a matching pixel value, i.e. a luminance value which can be used for the pixel to be set 42, within the high resolution image 41 several neighboring pixels 43 being near to the pixel to be set 42 are defined. The neighboring pixels 43 are shown as squares having a bold border. These pixels correspond to pixels, which have already been set in the high resolution image 41. In the present example the neighboring pixels 43 comprise two grey pixels, a white pixel and a black pixel. For each of the neighboring pixels 43 pixels within the low resolution image 40 are determined. This is indicated by dashed arrows indicating different pixels within the low resolution image 40. The determination can be accomplished with different methods. Either those pixels are determined in the low resolution image 40 which have been used for setting the respective neighboring pixels 43 in the high resolution image. Alternatively, pixels having the same pixel value like the neighboring pixels 43 in the high resolution image are determined, i.e. in the low resolution image 40 two grey pixels, a black pixel and a white pixel are searched and indicated by the dashed arrows. Additionally, some pixels within the low resolution image can be arbitrarily chosen.

Depending on the pixel position of the neighboring pixels 43 within the high resolution image 41 groups of neighboring pixels 45 within the low resolution image are also defined. The neighboring pixels 45 are defined in a way that the neighboring pixels in the different images having corresponding pixel values within the respective group of neighboring pixels have the same position. For example the black pixel within the group of neighboring pixels 43 in the high resolution image 41 has the same position like the corresponding black pixel within the group of neighboring pixels 45 in the low resolution image 40. Hereby, the pixels in the low resolution image 40 having within the groups of neighboring pixels 45 the same position as the pixel to be set 42 are designated with "x".

Next, the different pixel groups defined as neighborhood within the low resolution image 40 are compared with the neighborhood pixels 43 within the high resolution image 41. The low resolution neighboring pixels 45 which have the smallest error compared with the neighboring pixels 43 within the high resolution image 41 are determined. After detecting the neighboring pixels having the smallest error the pixel in the low resolution image 40 having the same position as the pixel to be set 42 in the high resolution image 41 is used as pixel value for pixel to be set 42 and is inserted in the pixel to be set 42.

For determining the error the following equation is used. Hereby, for all pixels within the neighborhood the pixel difference $\delta_P$, i.e. the difference in the luminance values is weighted according to the following function and afterwards summed up:

$$\Delta_P(\delta_P) = \frac{\ln\left(\left(\frac{\delta_P}{255} - \frac{1}{\alpha}\right)^2 + 1\right)}{\ln\left(\left(\frac{1}{\alpha}\right)^2 + 1\right)} \cdot (255)^2$$

The above equation is exemplary for 8 bit signals but can be adapted to any other signal type.

The parameter α determines the evaluation of deviations. According to the method developed by Harrison α is set to α=0.12 so that even small deviations are weighted.

Above equation bases on the idea of weighting the deviations so that even small deviations have a large weight so that errors are enhanced so that these candidates "x" are not selected as pixel value for the pixel to be set 42.

FIG. 6 has been explained based on the presumption that several pixels have already been set. When starting the method, several pixels in the high resolution image 41 are arbitrarily set and then the further pixels are set based on the described method with reference to FIG. 6, whereby the pixels which have been set at the beginning can be re-set and corrected several times.

Now, a second example of a method of resynthesizing will be explained. This method bases on the method developed by Vivek Kwatra et al.: "Graphcut Textures: Image and Video Synthesis Using Graph Cuts", GVU Center/College of Computing, Georgia Institute of Technology which is included herein by reference. For this method, not single pixels of the low resolution image are used to set pixels within the high resolution image, but smaller parts or "patches" of the low resolution image comprising several pixels are used. Also with this method several patches are chosen as candidate for the high resolution image and the patch having the smallest error is chosen. For this method a specific graph cut technique is used for cutting out the patches within the low resolution image.

The principle of this method is to combine already generated parts in the high resolution image with the patch to be inserted from the low resolution image. Hereby, the borders of the patch to be inserted are adapted in a way that the break between the already generated part and the newly inserted patch is not seen. This is accomplished by using already existing edges and borders within the high resolution image so that no new edges or breaks are created when inserting the patch.

An overview of the method for providing a high resolution texture within an image is given in FIG. 7. The process starts in step S0 and in step S1 the input signal, i.e. the texture information 2 is received by the system 1. In the next step S2 at least a first and a second signal are generated based on the received input signal, i.e. based on the texture information 2. Hereby also further signals can be generated and processed in further ways, that means that the present invention is not limited to the generation of two signals. The first signal 4 in step S3 is submitted to the resynthesizing instance 5. In the next step S4 the resynthesizing instance 5 resynthesizes the first signal 4 and in step S5 submits the resynthesized first signal 6 to the combination instance 7.

Parallel to this process after generating the two signals the generated second signal 9 in step S6 is submitted to the interpolation instance 10. In the next step S7 the interpolation instance 10 interpolates the second signal 9 and in step S8 submits the interpolated second signal 11 to the combination instance 7.

In the next step S9 the combination instance 7 combines the resynthesized first signal 6 with the interpolated second signal 11 by adding the resynthesized first signal 6 to the interpolated second signal 11. In the next step S10 the combination instance 7 outputs the combined signal 12 comprising the high resolution texture. The process ends in step S11.

For providing a better overview of the achievements of the present invention in FIG. 8 several examples of high resolution image obtained by different methods are shown. FIG. 8f hereby is the original image and FIG. 8a shows the low resolution image how it is received by the systems for providing a high resolution image.

Figure 8A:
Figure 8B:
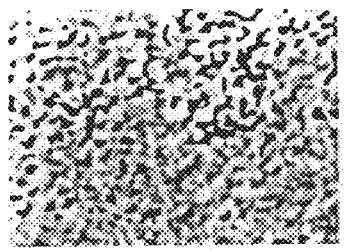
Figure 8C:
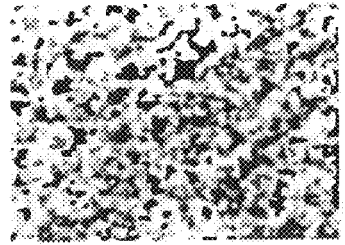
Figure 8D:
Figure 8E:
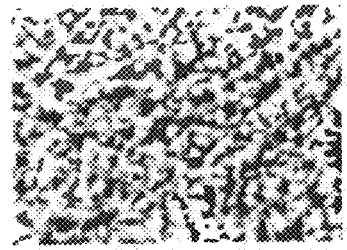
Figure 8F:

FIG. 8b shows an image obtained with only resynthesizing the whole image. As can be seen hereby the image is sharp but the structures itself have not been maintained. In FIG. 8c a modified resynthesis method has been used which regards the proportions of the original image. Hereby, the image in some parts still is coarse grained. FIG. 8d shows a high resolution image created with an interpolation. As can be seen the image is not sharp. FIG. 8e shows a high resolution image obtained by the present invention, in which a very high sharpness is achieved but at the same time the original structures are maintained.

The present invention further has the advantage that the image is quite sharp since when generating the high frequency parts only already existing pixel values are used and therefore no additional blurring is created.

With the present invention the texture within a received low resolution image can be enlarged and adapted to a high resolution in a very good and effective way. In case that a sequence of several images containing the same texture parts is received and has to be shown, then in case the texture part is calculated anew for every image sequence, then a temporal jittering would be the result.

The present invention therefore further proposes a system for processing image sequences.

Such a system 50 is explained with reference to FIG. 9. If a previous first low resolution image has already been processed and enlarged for a high resolution by a corresponding system 58 using the present method, the respective previous high resolution image can be stored in a buffer 54. Specifically, the system 58 for generating a high resolution image comprises a system 1 for providing a high resolution texture within an image according to the present invention. Advantageously, in the buffer 54 not only the high resolution texture is stored but also other high resolution parts of the previous image. The high resolution texture information 55 from the buffer 54 for the previous image is submitted to a final processing instance 56. In case that a subsequent second low resolution image is received, then the second image is also fed to the final processing instance 56.

Further, the first and second low resolution images are also submitted to an analyzing instance 52. The analyzing instance compares the both low resolution images in order to determine texture parts contained within both images. The analyzing instance 52 further determines the motion characteristics of the texture parts contained within both images, i.e. determines motion vectors 53 characterizing the movement direction and the velocity of the texture parts. The analyzing instance 52 submits the information on the texture parts and the motion vectors 53 also to the final processing instance 56.

The final processing instance 56 then in the now received second low resolution image can use the previously calculated high resolution texture of the previous image submitted by the buffer 54 and insert it into the created second high resolution image. This ensures that in the high resolution image the same high resolution texture part is used so that no jittering arises. The final processing instance 56 then outputs the processed subsequent image 57.

When processing two subsequent images according to the above explained method, then advantageously the previous explained method and system 1 for providing a high resolution texture is used. The combination thereby allows to create an image sequence being sharp, reflecting the original structure and having a reduced jittering.

The present system, method and computer program product can specifically be used when displaying images in nonstroboscopic display devices, in particular Liquid Crystal Display Panels (LCDs), Thin Film Transistor Displays (TFTs), Color Sequential Displays, Plasma Display Panels (PDPs), Digital Micro Mirror Devices or Organic Light Emitting Diode (OLED) displays.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. System for providing a high resolution texture within an image, comprising
    means to receive texture information contained within a low resolution image and to generate at least a first and a second signal based on the received texture information,
    wherein the first signal comprises high frequency parts of the received texture information,
    means to resynthesize the first signal by inserting a plurality of parts of the low resolution image into the high resolution image in an appropriate combination,
    means to interpolate the second generated signal and
    means to combine the resynthesized first signal with the interpolated second signal.

2. System according to claim 1,
    wherein the means to resynthesize define a group of neighboring pixels within the high resolution image and compare said group with a group of neighboring pixels in the low resolution image.

3. System according to claim 2,
    wherein the means to resynthesize select a pixel value of the low resolution image to be inserted into the high resolution image dependent on the comparison of the neighboring pixels within the two images.

4. System according to claim 2,
    wherein the means to resynthesize select a patch consisting of several pixels of the low resolution image to be inserted into the high resolution image dependent on the comparison of the neighboring pixels within the two images.

5. System according to claim 1,
    wherein the means to generate at least a first and a second signal comprise a low pass filter for generating a second signal comprising the low frequency parts.

6. System according to claim 5,
    wherein the means to generate at least a first and a second signal comprise means to subtract the second signal comprising the low frequency parts from the received texture information to generate said first signal comprising the high frequency parts of said received texture information.

7. System according to claim 1,
    wherein the means to generate at last a first and a second signal comprise means to split the texture information into a first signal comprising high and middle frequency parts of the texture information and into a second signal comprising low and middle frequency parts of the texture information.

8. System according to claim 1,
    wherein the means to generate at last a first and a second signal comprise a high pass filter for generating a first signal comprising the high frequency parts of the texture information.

9. System according to claim 8,
    wherein the means to generate at last a first and a second signal comprise means to generate a second signal being identical to the received texture information.

10. Method for providing a high resolution texture within an image, comprising the steps of
    receiving texture information contained within a low resolution image,
    generating at least a first and a second signal based on the received texture information, wherein the first signal comprises high frequency parts of the received texture information,
    resynthesizing the first signal by inserting a plurality of parts of the low resolution image into the high resolution image in an appropriate combination,
    interpolating the second generated signal and
    combining the resynthesized first signal with the interpolated second signal.

11. Method according to claim 10,
    wherein the step of resynthesizing comprises defining a group of neighboring pixels within the high resolution image and comparing said group with a group of neighboring pixels in the low resolution image.

12. Method according to claim 11,
    wherein the step of resynthesizing comprises selecting a pixel value of the low resolution image to be inserted into the high resolution image dependent on the comparison of the neighboring pixels within the two images.

13. Method according to claim 11,
    wherein the step of resynthesizing comprises selecting a patch consisting of several pixels of the low resolution image to be inserted into the high resolution image dependent on the comparison of the neighboring pixels within the two images.

14. Method according to claim 10,
    comprising generating a second signal comprising the low frequency parts.

15. Method according to claim 14,
    comprising subtracting the second signal comprising the low frequency parts from the received texture information to generate said first signal comprising the high frequency parts of said received texture information.

16. Method according to claim 10,
    comprising splitting the texture information into a first signal comprising high and middle frequency parts of the texture information and into a second signal comprising low and middle frequency parts of the texture information.

17. Method according to claim 10,
    comprising generating a first signal comprising the high frequency parts of the texture information.

18. Method according to claim 17,
    comprising generating a second signal being identical to the received texture information.

19. A non-transitory computer readable medium that stores a computer program product which, when executed by a computer, causes the computer to perform the steps of:
  receiving texture information contained within a low resolution image,
  generating at least a first and a second signal based on the received texture information, wherein the first signal comprises high frequency parts of the received texture information,
  resynthesizing the first signal by inserting a plurality of parts of the low resolution image into the high resolution image in an appropriate combination,
  interpolating the second generated signal and
  combining the resynthesized first signal with the interpolated second signal.

20. System for processing an image sequence containing texture information, comprising
  means to receive a first low resolution image and subsequent second low resolution image,
  means to analyze the two images to detect an identical texture part within the two subsequent images and to determine the motion characteristics of the texture part,
  means to provide the first image with a high resolution containing said texture part with high resolution and
  means to generate the second image with a high resolution thereby inserting the high resolution texture part of the first image into the high resolution second image dependent on said motion characteristics.

21. Method for processing an image sequence containing texture information comprising the steps of
  receiving a first low resolution image and subsequent second low resolution image,
  analyzing the two images to detect an identical texture part within the two subsequent images and to determine the motion characteristics of the texture part,
  providing the first image with a high resolution containing said texture part with high resolution and
  generating the second image with a high resolution thereby inserting the high resolution texture part of the first image into the high resolution second image dependent on said motion characteristics.

22. A non-transitory computer readable medium that stores a computer program product which, when executed by a computer, causes the computer to perform the steps of:
  receiving a first low resolution image and subsequent second low resolution image,
  analyzing the two images to detect an identical texture part within the two subsequent images and to determine the motion characteristics of the texture part,
  providing the first image with a high resolution containing said texture part with high resolution and
  generating the second image with a high resolution thereby inserting the high resolution texture part of the first image into the high resolution second image dependent on said motion characteristics.

* * * * *